United States Patent [19]

Duffy et al.

[11] Patent Number: 5,758,798

[45] Date of Patent: Jun. 2, 1998

[54] PARTS ORIENTOR AND METHOD

[75] Inventors: Richard J. Duffy, Shelby Township; Eugene D. Sessa, MT. Clements, both of Mich.

[73] Assignee: Nylok Fastener Corporation, MaComb, Mich.

[21] Appl. No.: 684,494

[22] Filed: Jul. 19, 1996

[51] Int. Cl.$^6$ ..................... B65H 5/20
[52] U.S. Cl. .................. 221/236; 221/233; 221/298; 221/264; 221/225; 221/173; 221/167; 221/13; 198/459.7; 198/463.6
[58] Field of Search ................ 198/459.7, 463.6; 221/233, 236, 264, 298, 167, 173, 225, 13

[56] References Cited

U.S. PATENT DOCUMENTS

| | | | |
|---|---|---|---|
| 2,611,911 | 9/1952 | Graham et al. | 221/298 |
| 2,803,377 | 8/1957 | Wilson | 221/225 |
| 2,916,125 | 12/1959 | Wallberg | 221/298 |
| 3,169,662 | 2/1965 | Goran, Jr. | 221/236 |
| 3,540,622 | 11/1970 | Spisak | 221/233 |
| 3,895,431 | 7/1975 | Froehlking | 221/233 |
| 4,208,153 | 6/1980 | Trethewy | 221/264 |
| 4,801,043 | 1/1989 | Cindric . | |

OTHER PUBLICATIONS

Quick Sort End to End Orienting Device, Online Inc. Orientor 2000, Automation Works, Inc.

*Primary Examiner*—William E. Terrell
*Assistant Examiner*—Khoi H. Tran
*Attorney, Agent, or Firm*—Niro, Scavone, Haller & Niro

[57] ABSTRACT

An improved machine and method for properly orienting two or more sets of parts having different lengths. An escapement mechanism and a length adjusting rod are employed in conjunction with a reciprocating shuttle block. The shuttle block houses a single orientor shaft and parts receiving nest. A sensing mechanism, preferably employing photoelectric fibre optic sensors, is used to control the flow of parts into and away from the orientor.

14 Claims, 4 Drawing Sheets

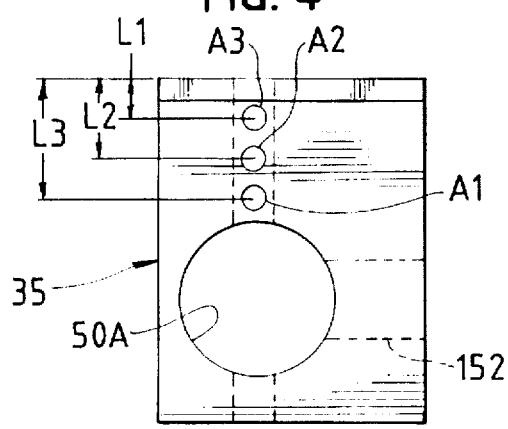
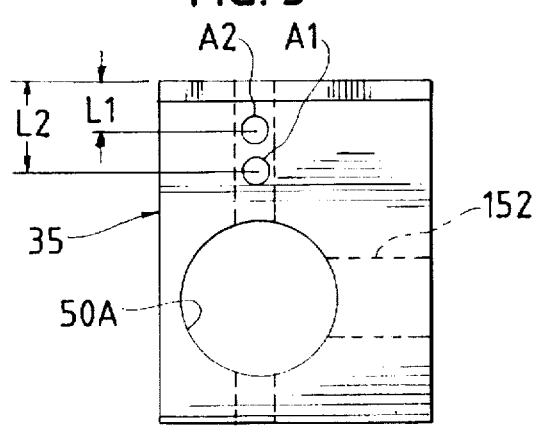
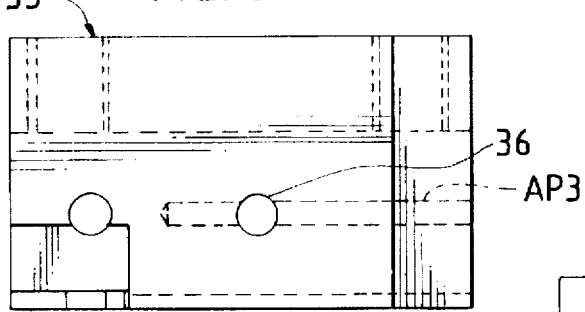
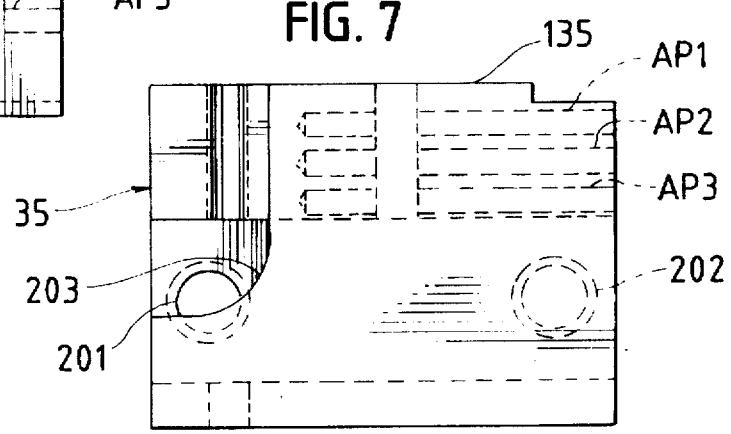
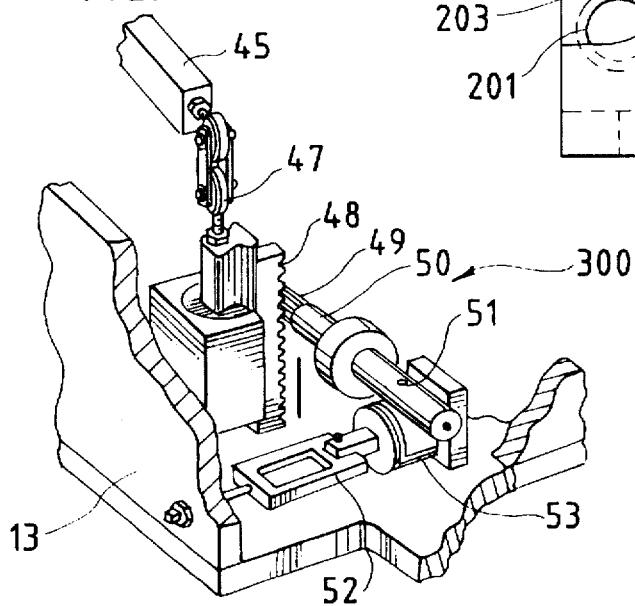

PARTS ORIENTOR AND METHOD

BACKGROUND OF THE INVENTION

This application generally relates to an improved machine and method for orienting parts, which allows the sequential orienting of parts at high speeds and production rates. More specifically, the invention relates to an improved orientor which will reduce tooling and set-up time, while permitting the orientation of parts with different lengths using a single reciprocating shuttle/nest combination.

This application is an improvement over U.S. Pat. No. 4,801,043 ("the '043 patent"), which is hereby incorporated by reference in its entirety into this application. While the '043 patent describes a parts orientor which has proven successful, further improvements are possible. More specifically, for each set of parts to be oriented having differing lengths, the '043 patent requires a different shuttle block with different dimensions. It would be advantageous to provide a single shuttle block that could accommodate the orienting of multiple part lengths, since this would reduce tooling requirements and machine set-up time. It would also be advantageous to provide a mechanism to ensure that only one part is supplied to the nest within the shuttle at a time, to reduce the possibility of jamming, which sometimes occurred with the orientor machine made according to the '043 patent.

SUMMARY OF THE INVENTION

Advantages realized by the '043 patent are preserved, and additional advantages not realized by the '043 patent or other prior art machines and methods are also realized by the present invention.

A preferred embodiment of the invention is a parts orienting machine for sequentially orienting parts. The parts orienting machine includes a frame, and a reciprocating shuttle mounted on the frame. The shuttle includes two or more vertically spaced axial passageways and inlet and outlet passageways. The inlet passageway communicates with each of the axial passageways, and is also in periodic alignment with an inlet parts feeder for receiving disoriented parts. An escapement mechanism is mounted to the frame, and is responsive to the reciprocating movement of the shuttle. The escapement mechanism allows the periodic release of a part to the inlet passageway. A length adjusting rod is selectively insertable within a selected one of the axial passageways and cooperates with the reciprocating movement of the shuttle to limit movement of the part within the shuttle for a predetermined time. Finally, the orientor machine includes mechanisms for sensing whether a part located within the shuttle is properly oriented relative to other parts, for properly orienting a disoriented part, and for discharging a properly oriented part through the shuttle outlet passageway.

In one embodiment, the mechanism for sensing the proper orientation of a part includes a probe or plunger successively movable within the inlet passageway for engaging a part located within the shuttle.

In a preferred embodiment, the escapement mechanism includes a tensioned pin normally positioned to block the inlet parts feeder. Periodic movement of the shuttle causes the pin to no longer block the inlet parts feeder, permitting a part to pass into the shuttle inlet passageway. In a particularly preferred embodiment, the pin is mounted in a block attached to the frame through a leaf spring; periodic movement of the shuttle causes the shuttle to contact the block, causing the pin to no longer block the inlet parts feeder.

In another embodiment, the means for sensing and for properly orienting a disoriented part includes a single selectively rotatable orientor shaft positionable within the shuttle. The orientor shaft is coupled to a single parts receiving nest, preferably substantially enclosed by the shuttle, in periodic alignment with the inlet and outlet passageways.

A mechanism, such as a cam drive or drives, is used to reciprocate the shuttle back and forth, to successively align the parts receiving nest with the inlet and outlet passageways.

Mechanisms for regulating the feed rate of the orientor machine are also disclosed. In a preferred embodiment, photoelectric fibre optic sensors are positioned adjacent the inlet parts feeder, to regulate the feed rate from the inlet parts feeder to the shuttle. Photoelectric fibre optic sensors can also be positioned adjacent the shuttle outlet passageway or the discharge tube, to regulate the part feed rate from the orientor machine to a downstream processing machine, such as a horizontal pinwheel machine.

An automated process for orienting parts is also disclosed, and includes the following steps:

a. providing a reciprocating shuttle mounted on a frame, the shuttle including two or more spaced axial passageways, and inlet and outlet passageways, with the inlet passageway communicating with each of the axial passageways and also being in periodic alignment with an inlet parts feeder for receiving disoriented parts, and the outlet passageway permitting the discharge of oriented parts;

b. periodically releasing a part to the inlet passageway using an escapement mechanism which permits this periodic release in cooperation with the reciprocating movement of the shuttle;

c. utilizing the reciprocating movement of the shuttle to selectively insert a length adjusting rod within one of the two or more axial passageways, thereby limiting movement of a part positioned within the shuttle, with the selection of the axial passageway being dependent upon the length of the parts to be oriented;

d. sensing whether a part located within the shuttle is properly oriented relative to other parts and properly orienting a disoriented part;

e. discharging a properly oriented part; and e. repeating steps b–e.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

FIGS. 4 and 5 are end views of the shuttle block;

FIG. 6 is a top view of the shuttle block; and

FIG. 7 is a side view of the shuttle block; and

FIG. 8 is an enlarged fragmentary perspective view showing one embodiment of the mechanism for rotating the parts receiving nest.

DESCRIPTION OF THE PREFERRED EMBODIMENTS

Figure 1:
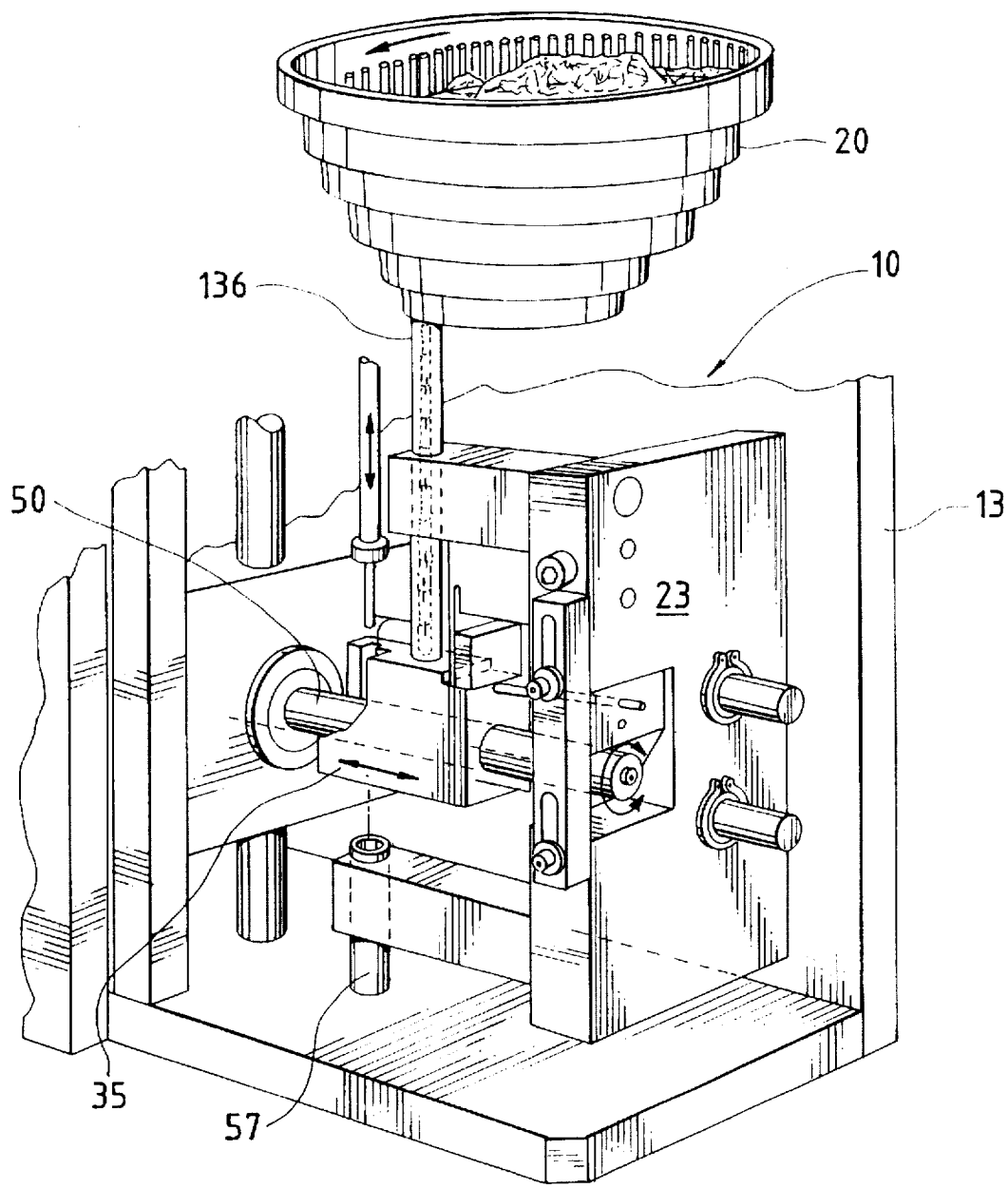
FIG. 1 is a perspective view of one embodiment of the parts orientor according to the present invention.
Figure 2:
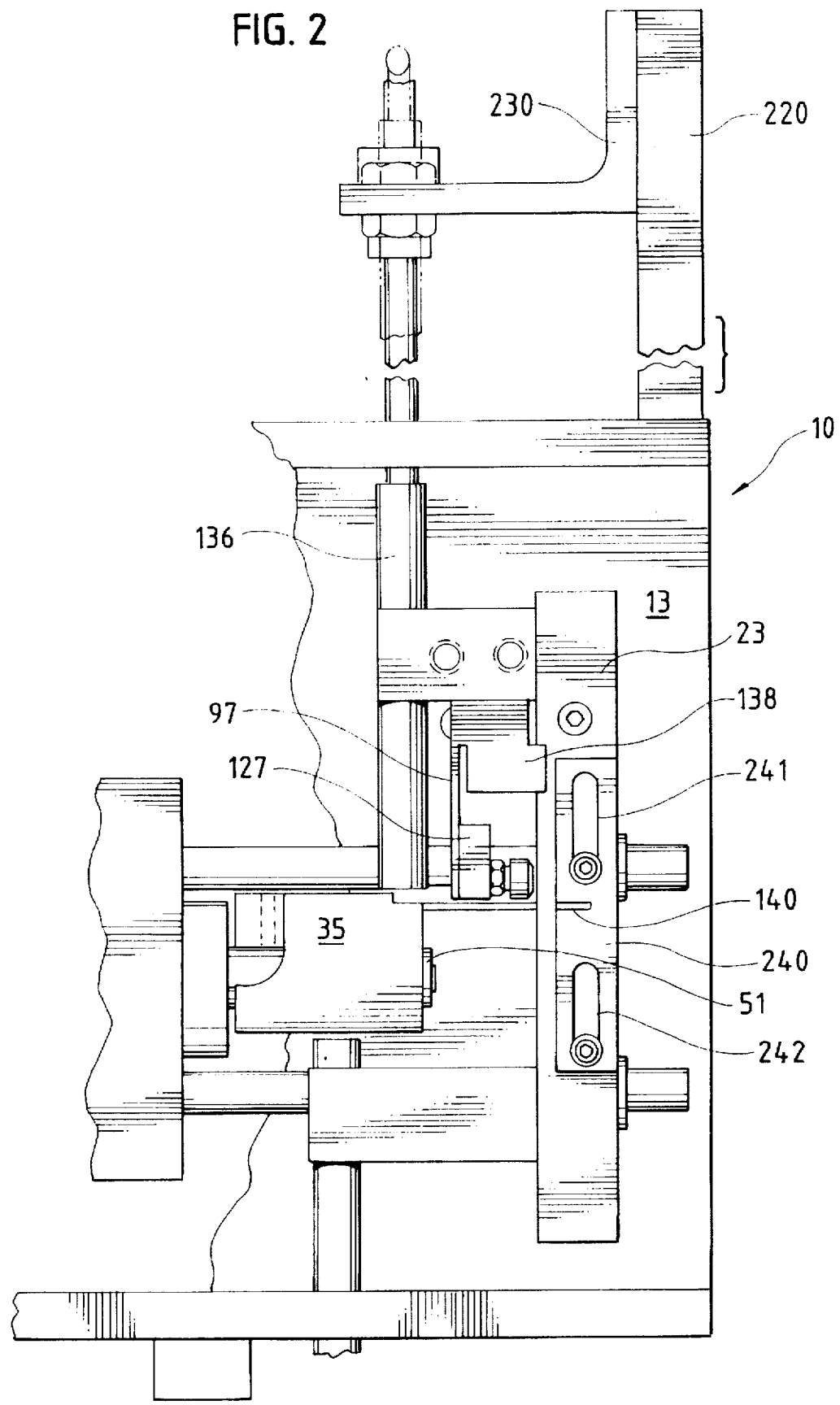
FIG. 2 is a front view of FIG. 1.

Referring to FIGS. 1 and 2, one embodiment of the improved parts orientor machine of the present invention, designated generally as 10, is shown.

The structure, function and operation of the orientor machine disclosed here is similar to that of the orientor machine described in the '043 patent, incorporated herein by reference, except as specified below.

In the specific embodiment of the present invention disclosed in the drawings, two differently-sized shuttle blocks 35 (end views of which are shown in FIGS. 4 and 5) were designed to accommodate screw diameters #4 through 5/16 and M3 through M8. Horizontal axial passageways AP1, AP2 and AP3, sized to accept length adjusting pin 140, were drilled through the centerline of inlet passageway 36 of shuttle block 35. Axial passageways AP1, AP2 and AP3 are properly vertically spaced (and separated by spaces L1, L2 or L3, as noted on FIGS. 4 and 5) so that up to three lengths of parts can be accepted within each shuttle block.

Figure 3A:
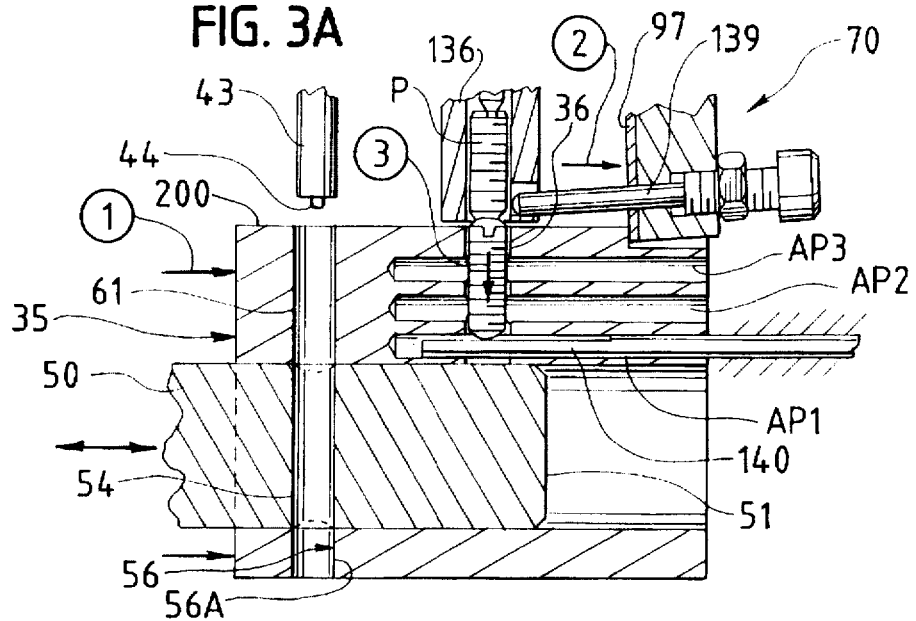
FIGS. 3A–3C are sequential exploded side views, in partial cross-section, of the shuttle block, nest and escapement mechanism of an embodiment according to the present invention, showing movement of a part to be oriented through the shuttle.
Figure 3B:
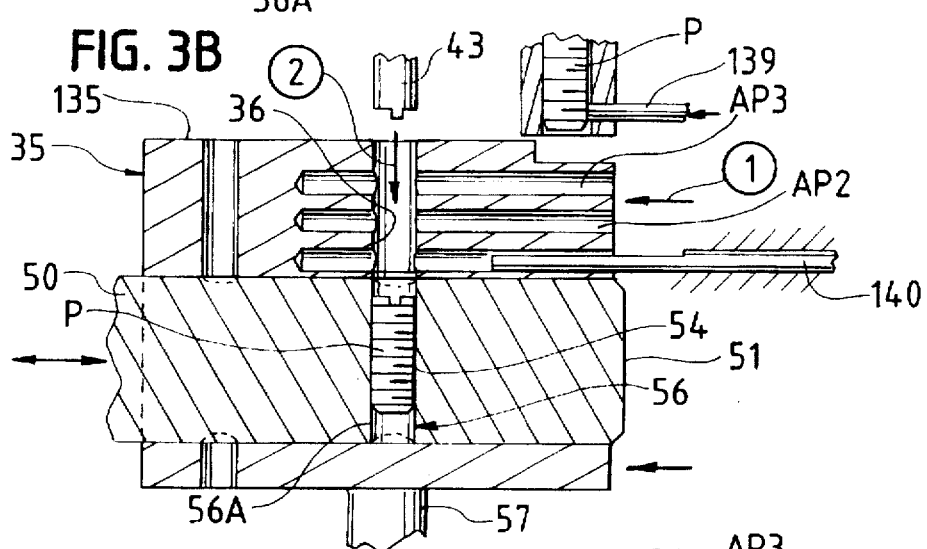

Referring now to FIGS. 2, 3A and 3B, a preferred embodiment of the escapement mechanism of the present invention, designated generally as 70, is shown. Escapement mechanism 70 permits the sequential feeding of individual parts to inlet passageway 36 of shuttle block 35. Escapement mechanism 70 includes retracting pin 139, which is rigidly attached to reciprocating pin block 127. Reciprocating pin block 127 is attached to tensioned leaf spring 97 which, in turn, is attached to tensioning block 138.

Referring now to FIGS. 1, 2 and 3A–3C, the operation of the improved orientor machine 10 is now described. Parts are provided to a feeder mechanism, such as conically-shaped feeder bowl 20. The parts are stacked within feed tube 136. Shuttle block 35 reciprocates back and forth, as disclosed in the '043 patent. As shuttle block 35 moves to the right (which step is designated by the circled number "1" in FIG. 3A), it engages escapement mechanism retracting pin 139 (which step is designated by the circled number "2" in FIG. 3A), releasing a part P from feed tube 136. At the same time, since shuttle 35 is moving to the right, length adjusting pin 140 is advanced into a selected horizontal axial passageway, blocking inlet passageway 36 and preventing any further movement of the part within the shuttle (which step is designated by the circled number "3" in FIG. 3A).

Referring now to FIG. 3B, a part P is now located within shuttle 35. As shuttle 35 moves back to the left, retracting pin 139 contacts and restrains the last part holding back the stack, while length adjusting pin 140 is withdrawn from the selected axial passageway, no longer blocking shuttle inlet passageway 36 (which sequential steps are designated by the circled numbers "1" and "2" in FIG. 3B). The part within the shuttle is now allowed to descend into parts receiving nest 51 before shuttle 35 reaches a horizontal probe position.

It will now be understood that use of escapement mechanism 70 will ensure the feeding of one part at a time while allowing the entire weight of the feed stack to aid in pushing the end part into inlet passageway 36 of shuttle 35.

Figure 3C:
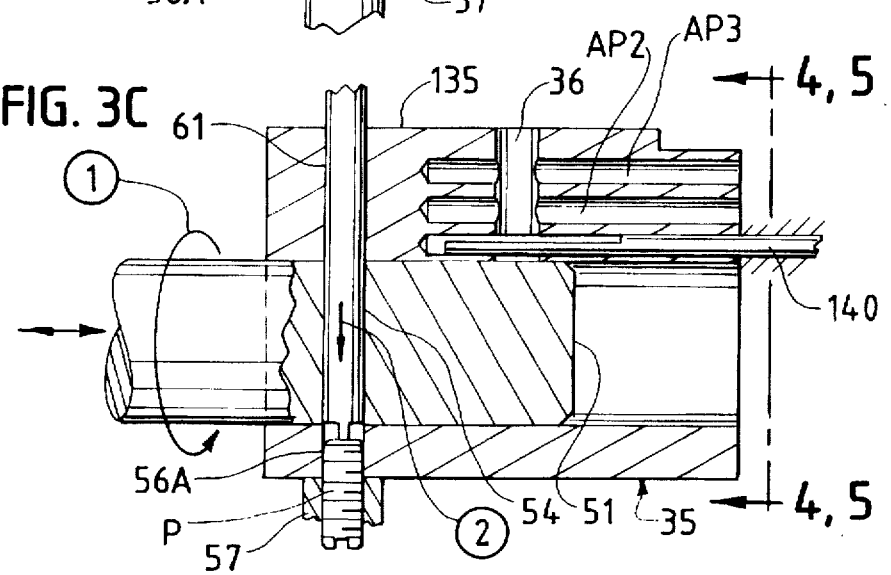

Referring now to FIGS. 3C and 8, sensing and orienting are now accomplished in a fashion similar to that described in the '043 patent. Thus, FIG. 3C shows the steps (designated by the circled numbers "1" and "2" in FIG. 3C) of the rotation of orientor shaft 50 (assuming the part has been found to be in a disoriented position), and of the discharge of the properly oriented part from shuttle outlet passageway 56A to discharge tube 57. Plunger 43 descends down through inlet portion 61 of discharge passageway 56, through nest passageway 54, and into outlet passageway 56A to discharge the properly oriented part.

FIG. 8 shows one preferred embodiment of an orientor mechanism, generally designated as 300, that can be used to properly orient a disoriented part by selectively rotating a parts receiving nest 51. More specifically, orienting mechanism 300 includes an orientor shaft 50 which fits within aperture 50A of shuttle 35. When a part P (e.g., a set screw) is positioned upside-down with (for example) the hex recess on the bottom, vertical plunger 43 moves down to push the part into orienting nest 51; now, plunger tip 44 of the spring-loaded plunger/probe 43 seats in the "bottom" or threaded drive end of the screw. A flag (such as flag 58 in the '043 patent) on the opposite side does not travel far enough to engergize a static proximity switch (see switch 59 of FIG. 1 of the '043 patent). In this condition, solenoid 53 and lock-out slide 52 remain static and rack 48 is allowed to move down and turn pinion 49 and orienting nest 51 so that the nest 51 rotates 180θ. Once the part has been properly oriented and discharged from outlet passageway 57, it travels through discharge tube 57, and can be provided to a discharge area or a processing machine such as a horizontal pinwheel.

As described in the '043 patent, sensing is accomplished using a probe or plunger 43 with a plunger pin 44 that determines the orientation of a part P (such as a set screw, for example) depending upon the height of the plunger (which depends upon whether or not plunger pin 44 is able to partially descend into the screw head).

In the preferred embodiment, photoelectric fibre optic sensors (not shown) are installed in feed tube 136 and discharge tube 57. Plate 220 and bracket 230 can be used to support the feed tube 136 and adjacent fibre optic sensors, for example. The feed tube sensors can be used to start and stop feeder bowl 20, providing a relatively constant feed of parts to escapement mechanism 70 and to parts receiving nest 51. Similarly, discharge tube sensors can be used to start and stop orientor 10, providing a relatively constant feed of parts to the processing machine. These sensors will also tend to reduce or eliminate jams and back pressure caused by over-feeding.

The top end surface of length adjusting pin 140 which mates with the part P is preferably flat, not round, to ensure that the parts do not tilt in the inlet passageway, and interfere with proper sensing/probing.

Also, axial passageways AP1, AP2 and AP3 are preferably dimensioned from the top surface 135 of shuttle block 35, so that when the part length is coupled with the flat on the end of pin 140, the part will extend somewhat above shuttle surface 135 (i.e., about 0.010 inches for small part diameters and up to 0.060 inches for the largest diameters). This will ensure that the next part in line will not fall into inlet passageway 36, causing a jam when shuttle 35 moves to the left.

Shuttle block 35 was also widened from the shuttle disclosed in the '043 patent, so that it now completely encloses nest 51, except in the vicinity of outlet passageway 56A. Nest 51 is preferably exposed here to allow proper angular alignment of probe 43 with nest 51 during machine set-up. For this purpose, radiused corner 203 (FIG. 7) has been provided on shuttle block 35, exposing nest 51 to the operator.

In the preferred embodiment, nest 51 is a cylindrical shaft coupled to orientor shaft 50 (as shown in FIG. 8), and includes nest passageway 54 (shown in FIGS. 3A–3C). Nest cylinders of different sizes, all with the same outer diameter, but with different nest passageway diameters, can be used to orient parts with differing diameters. When changing the orientor machine for use with a different part diameter, the nest and shuttle block, as well as the feed tube and exit tube diameters, should all be changed to an appropriate size, given the part diameter.

Still referring to FIG. 7, tapped holes 201 and 202 permit the entry of screws for fixing shuttle block 35 to a suitable reciprocating (cam-driven) mechanism, such as that disclosed in the '043 patent. The reciprocating mechanism is, in turn, attached to frame 13.

The probe cam (not shown here, but described in the '043 patent) was also redesigned to increase the down stroke of the probe in the sensing position. This allows the more accurate sensing of the orientation of relatively short parts (e.g., #4 screws that are ⅛-inch in length). Increasing the down stroke of the probe also provides the probe with sufficient movement to enable it to be lifted out of shuttle block 35 when short part lengths are sensed.

Referring to FIG. 1 and 2, plate 23 is fastened to orientor frame 13. Support block 240 is vertically adjustably attached to plate 23 to allow alignment of length adjusting pin 140 with the appropriate axial passageway (i.e., either AP1, AP2 or AP3 in shuttle block 35).

Due to the use of escapement mechanism 70 and the enclosure of nest 51 within shuttle 35, the improved orientor of the present invention does not require the use of a spring-loaded nest pin (such as pin 60 disclosed in the '043 patent). The purpose of the spring-loaded nest pin disclosed in the '043 patent was to restrain and hold the part when the nest was rotating. By enclosing the nest the part cannot be lost during nest rotation and, therefore, the nest pin is not required with the improved parts orientor of the present invention. Doing away with the nest pin reduces tooling and time, since otherwise the shuttle block height would need to be adjusted to accommodate the particular part length which is being oriented.

As used here, the term "part" includes any piece having a cavity on one end. Examples of "parts" include fasteners such as screws (e.g., set screws), bolts, etc.

It will be understood that the invention may be embodied in other specific forms without departing from its spirit or central characteristics. For example, those of ordinary skill in the art will recognize mechanisms for providing reciprocating movement to the shuttle block 35, as well as mechanisms for sensing the orientation of a part, other than those disclosed here and in the '043 patent. The present examples and embodiments, therefore, are to be considered in all respects as illustrative and not restrictive, and the invention is not to be limited to the details given here.

We claim:

1. A parts orienting machine for sequentially orienting parts, comprising:

a frame;

a reciprocating shuttle mounted on the frame and adapted to be used with two or more parts having different lengths, the shuttle including two or more vertically spaced horizontal axial passageways and vertical inlet and outlet passageways, the vertical inlet passageway communicating with each of the horizontal axial passageways and also in periodic alignment with an inlet parts feeder for receiving disoriented parts;

an escapement mechanism mounted to the frame and responsive to the reciprocating movement of the shuttle for allowing periodic release of a part to the vertical inlet passageway;

a length adjusting rod selectively insertable within a selected one of the two or more horizontal axial passageways and cooperating with the reciprocating vertical movement of the shuttle to limit movement of the part within the shuttle for a predetermined time; and means for sensing whether a part located within the shuttle is properly oriented relative to other parts, for properly orienting a disoriented part, and for discharging a properly oriented part through the shuttle outlet passageway.

2. The parts orienting machine of claim 1, wherein the escapement mechanism includes a tensioned pin normally positioned to block the vertical inlet parts feeder, and periodic movement of the shuttle causes the pin to no longer block the inlet parts feeder, permitting a part to pass into the shuttle vertical inlet passageway.

3. The parts orienting machine of claim 1, wherein the escapement mechanism includes a pin mounted in a block attached to the frame through a leaf spring and normally positioned to block the inlet parts feeder, whereby periodic movement of the shuttle causes the shuttle to contact the block, causing the pin to no longer block the inlet parts feeder and permitting a part to move into the vertical inlet passageway.

4. The parts orienting machine of claim 1, wherein the means for sensing and for properly orienting a disoriented part includes a single selectively rotatable orientor shaft positionable within the shuttle, the orientor shaft is coupled to a single parts receiving nest in periodic alignment with the vertical inlet and vertical outlet passageways.

5. The parts orienting machine of claim 4, further comprising means for reciprocating the shuttle back and forth for successively aligning the nest with the vertical inlet and outlet passageways.

6. The parts orienting machine of claim 4, further comprising means for regulating the feed rate from the inlet parts feeder to the shuttle.

7. The parts orienting machine of claim 6, wherein the means for sensing and for controlling includes photoelectric fibre optic sensors positioned adjacent the inlet parts feeder.

8. The parts orienting machine of claim 6, wherein the means for sensing and for controlling includes photoelectric fibre optic sensors positioned adjacent the vertical outlet passageway.

9. The parts orienting machine of claim 4, wherein the nest is substantially enclosed by the shuttle.

10. The parts orienting machine of claim 1, wherein the means for sensing includes a plunger successively movable within the vertical inlet passageway for engaging a part located within the shuttle.

11. The parts orienting machine of claim 1, further comprising means for regulating the feed rate from the shuttle to a downstream processing machine.

12. A parts orienting machine for sequentially orienting two or more different sets of parts, each of the sets having different lengths, comprising:

a frame;

a reciprocating shuttle mounted on the frame, the shuttle including two or more vertically spaced horizontal axial passageways, and vertical inlet and vertical outlet passageways, the inlet passageway communicating with each of the horizontal axial passageways and also in periodic alignment with an inlet parts feeder tube for receiving disoriented parts, and the vertical outlet passageway adapted to receive and discharge oriented parts;

an escapement mechanism mounted to the frame and responsive to the reciprocating movement of the shuttle for allowing periodic release of a part to the vertical inlet passageway;

a length adjusting rod selectively insertable within one of the two or more horizontal axial passageways and cooperating with the reciprocating vertical movement of the shuttle to limit movement of the part within the shuttle for a predetermined time; and mechanisms for sensing whether a part located within the shuttle is properly oriented relative to other parts and for properly orienting a disoriented part.

13. A process for orienting parts, comprising the steps of:

a. providing a reciprocating shuttle mounted on a frame, the shuttle including two or more spaced horizontal axial passageways, and vertical inlet and vertical outlet passageways, the inlet passageway communicating with each of the horizontal axial passageways and also in periodic alignment with an inlet parts feeder for receiving disoriented parts, and the vertical outlet passageway permitting the discharge of oriented parts;

b. periodically releasing a part to the vertical inlet passageway using an escapement mechanism which permits this periodic release in cooperation with the reciprocating movement of the shuttle;

c. utilizing the reciprocating movement of the shuttle to selectively insert a length adjusting rod within one of the two or more horizontal axial passageways, thereby limiting vertical movement of a part positioned within the shuttle, the selection of the horizontal axial passageway being dependent upon the length of the parts to be oriented;

d. sensing whether a part located within the shuttle is properly oriented relative to other parts and properly orienting a disoriented part;

e. discharging a properly oriented part; and e. repeating steps b–e.

14. A parts orienting machine for sequentially orienting parts, comprising:

a frame;

a moving shuttle mounted on the frame and adapted to be used with two or more parts having different lengths, the shuttle including two or more horizontal axial passageways for accepting different sets of parts with different lengths, and vertical inlet and outlet passageways, the inlet passageway communicating with each of the axial passageways and also in periodic alignment with an inlet parts feeder for receiving disoriented parts;

an escapement mechanism mounted to the frame and responsive to the movement of the shuttle for allowing periodic release of a part to the vertical inlet passageway;

a length adjusting rod selectively insertable within a selected one of the two or more horizontal axial passageways and cooperating with the vertical movement of the shuttle to limit movement of the part within the shuttle for a predetermined time; and means for sensing whether a part located within the shuttle is properly oriented relative to other parts, for properly orienting a disoriented part, and for discharging a properly oriented part through the shuttle vertical outlet passageway.

* * * * *